United States Patent
Guevara

(10) Patent No.: US 12,475,355 B2
(45) Date of Patent: Nov. 18, 2025

(54) QUANTIZING TRAINED LONG SHORT-TERM MEMORY NEURAL NETWORKS

(71) Applicant: Google LLC, Mountain View, CA (US)

(72) Inventor: Raziel Alvarez Guevara, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 983 days.

(21) Appl. No.: 17/289,227

(22) PCT Filed: Oct. 30, 2019

(86) PCT No.: PCT/US2019/058821
§ 371 (c)(1),
(2) Date: Apr. 27, 2021

(87) PCT Pub. No.: WO2020/092532
PCT Pub. Date: May 7, 2020

(65) Prior Publication Data
US 2022/0036155 A1 Feb. 3, 2022

Related U.S. Application Data

(60) Provisional application No. 62/752,914, filed on Oct. 30, 2018.

(51) Int. Cl.
*G06N 3/044* (2023.01)
*G06N 3/045* (2023.01)

(52) U.S. Cl.
CPC ............ *G06N 3/044* (2023.01); *G06N 3/045* (2023.01)

(58) Field of Classification Search
CPC ......... G06N 3/044; G06N 3/045; G06N 3/063
See application file for complete search history.

(56) References Cited

U.S. PATENT DOCUMENTS

| | | | |
|---|---|---|---|
| 10,579,383 B1 * | 3/2020 | Rotem | G06F 7/483 |
| 2007/0180434 A1 * | 8/2007 | Forin | G06F 8/447 |
| | | | 717/136 |

(Continued)

OTHER PUBLICATIONS

He, Qinyao, et al. "Effective quantization methods for recurrent neural networks." arXiv preprint arXiv:1611.10176 (2016), pp. 1-20 (Year: 2016).*

(Continued)

*Primary Examiner* — Omar F Fernandez Rivas
*Assistant Examiner* — Michael C. Lee
(74) *Attorney, Agent, or Firm* — Honigan LLP; Brent A. Krueger

(57) ABSTRACT

Method for quantizing a trained long short-term memory (LSTM) neural network having a plurality of weights, the method comprising: obtaining data specifying trained floating-point values for each of the weights of the trained LSTM neural network, the trained LSTM neural network comprising one or more LSTM layers, each LSTM layer having a plurality of gates and each of the plurality of gates being associated with an input weight matrix and a recurrent weight matrix; quantizing the trained LSTM neural network, comprising: for each gate, quantizing the elements of the input weight matrix to a target fixed bit-width; for each gate, quantizing the elements of the recurrent weight matrix to the target fixed bit-width; and providing data specifying a quantized LSTM neural network for use in performing quantized inference.

15 Claims, 4 Drawing Sheets

(56) References Cited

U.S. PATENT DOCUMENTS

| | | | | |
|---|---|---|---|---|
| 2015/0347819 | A1* | 12/2015 | Yin | G06V 40/172 |
| | | | | 382/118 |
| 2018/0121796 | A1* | 5/2018 | Deisher | G10L 15/16 |
| 2019/0012559 | A1* | 1/2019 | Desappan | G06V 10/764 |
| 2019/0042935 | A1* | 2/2019 | Deisher | G06N 3/044 |
| 2019/0171927 | A1* | 6/2019 | Diril | G06N 3/08 |
| 2019/0243610 | A1* | 8/2019 | Lin | G06N 3/08 |
| 2019/0294413 | A1* | 9/2019 | Vantrease | G06F 7/5095 |
| 2022/0019915 | A1* | 1/2022 | Bryan | G06F 30/20 |
| 2022/0366238 | A1* | 11/2022 | Liu | G06V 10/82 |

OTHER PUBLICATIONS

Alvarez, Raziel, et al. "On the efficient representation and execution of deep acoustic models." arXiv preprint arXiv:1607.04683 (Dec. 17, 2016) (Year: 2016).*

Lu, Yuzhen, et al. "Simplified gating in long short-term memory (lstm) recurrent neural networks." 2017 IEEE 60th international midwest symposium on circuits and systems (MWSCAS) (2017), pp. 1601-1604 (Year: 2017).*

Ott, Joachim, et al. "Recurrent neural networks with limited numerical precision." arXiv preprint arXiv:1608.06902 (2017), pp. 1-11 (Year: 2017).*

Wang, Zhisheng, et al. "Accelerating recurrent neural networks: A memory-efficient approach." IEEE Transactions on Very Large Scale Integration (VLSI) Systems 25.10 (2017): pp. 2763-2775 (Year: 2017).*

Zhou, Shu-Chang, et al. "Balanced quantization: An effective and efficient approach to quantized neural networks." Journal of Computer Science and Technology 32 (2017): pp. 667-682 (Year: 2017).*

Lai, Liangzhen, et al. "Rethinking machine learning development and deployment for edge devices." arXiv preprint arXiv: 1806.07846 (Jun. 20, 2018). (Year: 2018).*

Krishnamoorthi, Raghuraman. "Quantizing deep convolutional networks for efficient inference: A whitepaper." arXiv preprint arXiv: 1806.08342 (Jun. 21, 2018), pp. 1-36 (Year: 2018).*

International Search Report and Written Opinion for the related International Application No. PCT/US2019/058821 dated Apr. 20, 2020, 83 pages.

Raghuraman Krishnamoorthi: "Quantizing deep convolutional networks for efficient inference: A white paper", arxiv.org, Cornell University Library, 201 Olin Library Cornell University Ithaca, NY 14853, Jun. 21, 2018 (Jun. 21, 2018), XP080893243, 36 pages.

Benoit Jacob et al: "Quantization and Training of Neural Networks for Efficient Integer-Arithmetic-Only Inference", arxiv.org, Cornell University Library, 201 Olin Library Cornell University Ithaca, NY 14853, Dec. 16, 2017 (Dec. 16, 2017), XP 80846617, 14 pages.

Li-Wen Chang et al: "Accelerating Recurrent Neural Networks through Compiler Techniques and Quantizaton", Conference on Neural Information Processing Systems (NI PS), Dec. 3, 2018 (Dec. 3, 2018), XP055681357, Sections 4 and 5, 8 pages.

Alom Md Zahangir et al: "Effective Quantization Approaches for Recurrent Neural Networks", 2018 International Joint Conference on Neural Networks (IJCNN), IEEE, Jul. 8, 2018 (Jul. 8, 2018), pp. 1-8, XP033419197, DOI: 10.1109/IJCNN.2018.8489341 [retrieved on Oct. 10, 2018] Sections I and II I, 8 pages.

* cited by examiner

QUANTIZING TRAINED LONG SHORT-TERM MEMORY NEURAL NETWORKS

CROSS-REFERENCE TO RELATED APPLICATION

This application claims priority to U.S. Patent Application No. 62/752,914, filed on Oct. 30, 2018, the entirety of which is hereby incorporated by reference.

BACKGROUND

This specification relates to quantizing trained long short-term memory (LSTM) neural networks for use in performing quantized inference.

Neural networks are machine learning models that employ one or more layers of nonlinear units to predict an output for a received input. Some neural networks include one or more hidden layers, in addition to an output layer. The output of each hidden layer is used as input to the next layer in the network (i.e., the next hidden layer or the output layer). Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network uses some or all of the internal state of the network after processing a previous input in the input sequence in generating an output from the current input in the input sequence. One example of a recurrent neural network is an LSTM neural network. An LSTM neural network has one or more LSTM layers, which each contain one or more gates and a memory cell.

LSTM neural networks address the issue of storing information over extended time intervals. Information pertaining to the input sequence of the LSTM neural network passes through the one or more gates and a memory cell. Depending on the gate's function, the gate can control: how much information is allowed to enter the LSTM layer; how much information will be retained in the LSTM layer; and how much information is allowed to leave the LSTM layer as output for the next time-step. An LSTM neural network can be trained to optimize the decisions made at these gates to preserve only necessary information to process input sequences.

SUMMARY

This specification describes a trained LSTM neural network quantization system ("quantization system") implemented as one or more computer programs on one or more computers in one or more locations, which quantizes a trained LSTM neural network having one or more LSTM layers. In particular, the quantization system quantizes a trained LSTM neural network so that the LSTM neural network can be effectively used to perform quantized inference.

In general, one innovative aspect of the subject matter described in the specification can be embodied in methods that include the actions of (i) obtaining data specifying trained floating-point values for each of the weights of the trained LSTM neural network, the trained LSTM neural network comprising one or more LSTM layers, with each LSTM layer having a plurality of gates and each gate being associated with an input weight matrix and a recurrent weight matrix; (ii) quantizing the trained LSTM neural network, which includes quantizing, for each gate, the elements of the input weight matrix and the recurrent weight matrix to a target fixed bit-width; and (iii) providing data specifying a quantized LSTM neural network for use in performing quantized inference.

An input weight matrix refers to a matrix formed of weights which are values, e.g. multiplicative factors, used to modify corresponding inputs, e.g., an input vector, to the gate during a process performed by the gate to generate an output.

A recurrent weight matrix refers to a matrix formed of weights which are values, e.g. multiplicative factors, used to modify corresponding components of a recurrent vector. The recurrent vector may be previous outputs of the gate (i.e. the result when the process was previously performed by the gate), except in the case of at least the first occasion on which the gate performs the process. On that occasion, the recurrent vector can be predefined or set according to a random procedure.

The quantized LSTM neural network may be a neural network composed of units corresponding to the respective units of the trained LSTM neural network, and connected to each other in the same manner as the respective units of the trained LSTM neural network, but in which each gate of the quantized LSTM neural network employs the quantized elements of the input matrix and recurrent matrix of the corresponding gate of the trained LSTM neural network.

The term "quantized inference" means an inference task which transforms input data into output data by a procedure including each gate of the quantized LSTM neural network modifying an input vector using the corresponding quantized elements of the input weight matrix, e.g. by multiplying components of input vector to that gate by the corresponding quantized elements of the input weight matrix as multiplicative factors, and modifying a recurrent vector using the corresponding quantized elements of the recurrent weight matrix, e.g. multiplying components of the recurrent vector by the corresponding quantized elements of the recurrent weight matrix.

The recurrent vector can include previous outputs of the gate, i.e. the result when the process was previously performed by the gate on one or more previous occasions, except in the case of at least the first occasion on which the gate performs the process. On that occasion the recurrent vector may be predefined or set according to a random process.

The foregoing and other embodiments can each optionally include one or more of the following features, alone or in combination.

The step of quantizing the trained LSTM neural network can comprise determining a maximum value and a minimum value of the elements of (i) the input weight matrix and (ii) the recurrent weight matrix; for each gate this can comprise determining a scale factor, wherein the scale factor is:

$$\text{scale factor} = \frac{2^{\text{target fixed bit-width}} - 1}{|\text{maximum value} - \text{minimum value}|},$$

and for each gate applying the scale factor to the elements of the input weight matrix and the elements of the recurrent weight matrix.

Furthermore, the step of quantizing the trained LSTM neural network can comprise quantizing the elements of the input weight matrix to the target fixed bit-width or quantizing the elements of the recurrent weight matrix to the target fixed bit-width comprises using asymmetric quantization.

The step of quantizing the LSTM network further can comprise quantizing, for each gate, a respective gate output for the gate obtained by processing a respective input through the gate.

Furthermore, the step of quantizing, for each gate, the respective gate output for the gate can comprise quantizing the respective gate output using either asymmetric or symmetric quantization.

The target fixed bit-width can be 8 bits.

The step of quantizing the trained LSTM neural network can also comprise quantizing the elements of the input weight matrix to the target fixed bit-width or quantizing the elements of the recurrent weight matrix to the target fixed bit-width comprises using symmetric quantization.

As noted above, each LSTM layer can receive an input vector and a recurrent vector, and the step of quantizing the trained LSTM neural network can comprise: for each gate, determining a minimum and a maximum of the products of (i) the trained floating-point values of the input weight matrix and (ii) input vectors for a set of test inputs to the trained LSTM neural network; for each gate, determining a minimum and a maximum of products of (i) the trained floating-point values of the recurrent weight matrix and (ii) recurrent vectors for the set of test inputs; for each gate, determining a minimum and a maximum of respective gate outputs for the gate; and providing data specifying the quantized LSTM neural network for use in performing quantized inference, the data comprising: the minimum and the maximum of the products of the trained floating-point values of the input weight matrix and the input vectors for the set of test inputs, the minimum and the maximum of the products of the trained floating-point values of the recurrent weight matrix and the recurrent vectors for the set of test inputs, and the minimum and the maximum of the respective gate outputs for each gate in the LSTM neural network.

Furthermore, the step of quantizing the trained LSTM neural network can comprise determining whether one or more elements of (i) the input weight matrix or (ii) the recurrent weight matrix are represented as floating-point values; in response, determining a rounding error; and for each LSTM layer, quantizing one or more of (i) the elements of the input weight matrix to the target fixed bit-width and (ii) the elements of the recurrent weight matrix to the target fixed bit-width with the rounding error.

The trained LSTM neural network can be configured to receive data obtained using at least one sensor and representative of the real world. In one case, the data can be speech utterances and the set of test inputs is data representing a speech utterance.

For each gate, the method can comprise quantizing a gate bias for the gate to a target bias bit-width.

The target bias bit-width can be 32 bits.

The target bias bit-width can be different than the target fixed bit-width. The method can further comprise providing data specifying the quantized LSTM neural network for use in performing quantized inference comprises for each LSTM layer, providing the quantized gate bias for the gate.

The method can also comprise determining that a floating-point co-processor is available to a target computing device used to implement the trained LSTM neural network; and in response, for each gate, refraining from quantizing the gate bias for the gate.

Particular implementations of the subject matter described in this specification can be implemented so as to realize one or more of the following advantages. At inference time, a production system applying LSTM neural networks (e.g., for end-to-end speech recognition, translation, character recognition, and other sequence processing pipelines) typically runs on optimized hardware (e.g., a special purpose neural network hardware accelerator). Optimized hardware is typically built to execute neural network operations with lower precision operations (e.g., 8 bit fixed-point integers or 16 bit fixed-point integers). For recurrent neural networks (RNN), such as LSTM neural networks, this typically results in significant accuracy loss, as trained weights are often specified as floating-point values. The quantization system described in this specification allows for quantizing a trained LSTM neural network such that the LSTM neural network can be executed using lower precision operations (i.e., on low-precision hardware,) in a manner that results in negligible accuracy loss. Additionally, no modification to the training pipeline is necessary, as quantization occurs post-training. Not modifying the training pipeline at least has the advantages of allowing models that have already been trained to be deployed on hardware at inference that requires fixed-point values without re-training the models or modifying the functionality of the inference system. Another advantage is that the disclosed subject matter is simpler and less error-prone than training a neural network in a special manner to facilitate quantization before inference time. In fact, neural networks that are designed to be trained with quantization in mind ("quantization-aware") sometimes result in instability and added complexity in training, and require models that have already been trained to be re-trained before the models can be deployed.

The details of one or more implementations of the subject matter are set forth in the accompanying drawings and the description below. Other features, objects, and advantages of the subject matter will be apparent from the description and drawings, and from the claims.

BRIEF DESCRIPTION OF DRAWINGS

Like reference symbols in the various drawings indicate like elements.

DETAILED DESCRIPTION

Figure 1:
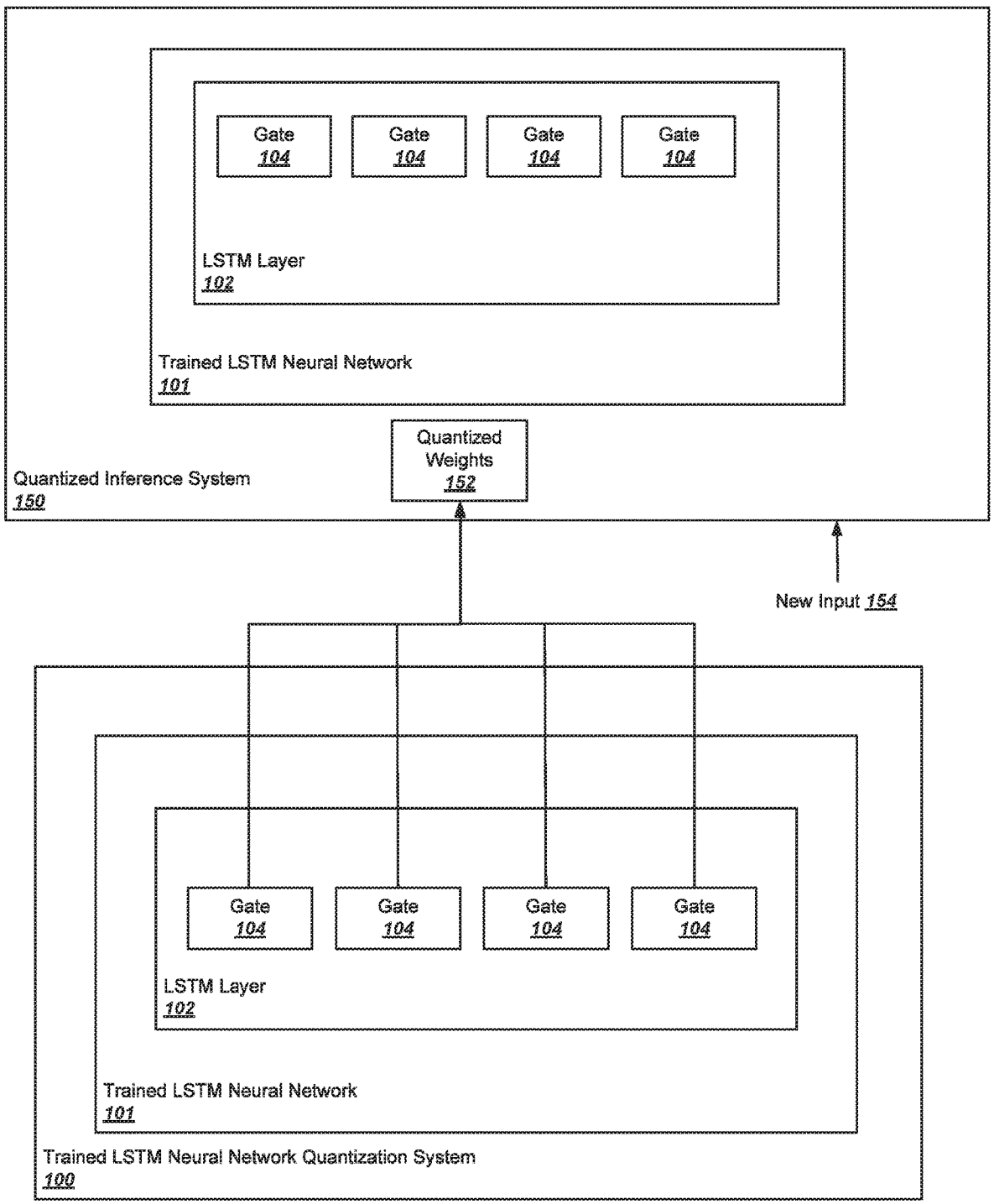
FIG. 1 shows an example trained LSTM neural network quantization system and an example quantized inference system.

FIG. 1 shows an example trained LSTM neural network quantization system ("quantization system") 100 and an example quantized inference system 150. The quantization system 100 and the quantized inference system 150 are examples of systems that are each implemented as one or more computer programs on one or more computers in one or more locations, in which the systems, components, and techniques described below can be implemented.

The quantization system 100 quantizes a trained LSTM neural network 101 for the quantized inference system 150 to use. A trained LSTM neural network means that the LSTM neural network has a set of weights, with each weight represented as a floating-point value that has been modified by applying a neural network training procedure to a training set of inputs.

LSTM neural networks are ideal for processing sequences of information that are time-dependent (i.e., the sequences change with the passage of time). LSTM neural networks can be trained and used during inference to perform a variety of tasks, including language translation, speech recognition, character recognition, and other sequence processing tasks where a sequence of information depends on time.

The trained LSTM neural network 101 includes one or more LSTM layers 102. Each LSTM layer includes one or more gates 104. Each gate 104 is associated with an input weight matrix and a recurrent weight matrix. For example, for an LSTM layer having three gates and a memory cell, for each time-step t in an input sequence, the operations of the gates and the memory cell can be represented mathematically as:

$$f_t = \sigma_g(W_f x_t + U_f h_{t-1} + b_f) \quad (1)$$

$$i_t = \sigma_g(W_i x_t + U_i h_{t-1} + b_i) \quad (2)$$

$$o_t = \sigma_g(W_o x_t + U_o h_{t-1} + b_o) \quad (3)$$

$$c_t = f_t \circ c_{t-1} + \sigma_c(W_c x_t + U_c h_{t-1} + b_c) \quad (4)$$

$$h_t = o_t \circ \sigma_h(c_t) \quad (5)$$

Each gate and memory cell has an input weight matrix W composed of weight vectors $W_f$, $W_i$, $W_o$ and $W_c$, and a recurrent weight matrix U composed of weight vectors $U_f$, $U_i$, $U_o$ and $U_c$, and, in some cases, a bias vector b composed of bias values $b_f$, $b_i$, $b_o$ and $b_c$. The activation function σ can be any activation function, such as sigmoid or tan h. Because the input for an LSTM neural network is a sequence of information that changes over a period of time, t represents the current time-step the input sequence processed by the LSTM layer is currently on. At each gate, and for each time-step t, the gates receive an input vector $x_t$ and a recurrent vector $h_{t-1}$. The input vector can come from another layer in the trained LSTM neural network, or come from a source outside the neural network. $h_{t-1}$ is the recurrent vector outputted by the LSTM layer at the previous time-step. If the current time-step is the first time-step, then $h_{t-1}$ is set to some initial value (e.g., zero). At a given time-step, vectors $\theta_t$, $i_t$, and $o_t$ are calculated using equations (1), (2), and (3), respectively. The memory cell $c_t$ is updated as in equation (4) and maintained internally in the LSTM layer. The operation ∘ can be element-wise multiplication (i.e., for two matrices of the same dimension, A and B, $(A \circ B)_{i,j} = (A)_{i,j}(B)_{i,j}$). The recurrent vector $h_t$ can be an output to another layer in the LSTM neural network but is also saved in the LSTM layer and used in processing the input sequence at the next time-step. Equations (1)-(5) are calculated iteratively for the input sequence for each time-step.

Training an LSTM neural network results in trained floating-point values being determined for each bias, and each element (representing a weight) of the input matrix and recurrent weight matrix, for each gate. However, at least the weights of the LSTM layers in the neural network are quantized before performing inference using a quantized inference system (e.g., the quantized inference system 150). This is because, generally, the quantized inference system 150 performs quantized inference. That is, the quantized inference system 150 stores and calculates numbers with reduced precision (i.e., in a compact format) while performing inference. For example, the quantized inference system 150 may perform inference using special-purpose hardware that is configured to perform computation using fixed-point arithmetic in order to allow the hardware to compute inferences with reduced latency. For example, a mobile device may have a specialized chip that performs neural network (and optionally other processor-intensive computation) in hardware using fixed-point arithmetic. As another example, the quantized inference system 150 may be implemented on a mobile device and may perform quantized inference to limit the amount of computational resources consumed by computing inferences.

Once the LSTM neural network 101 is trained and quantized, the quantized inference system 150 uses the quantized, trained LSTM neural network 101 to perform inference. That is, the quantized inference system 150 receives new inputs 154, (e.g., from users of the system) and processes those new inputs 154 using the trained LSTM neural network 101 to generate new network outputs.

The quantization system 100 quantizes the weights of the trained LSTM neural network 101 to a target fixed bit-width and provides data (e.g., quantized weights 152) specifying the quantized LSTM neural network to the quantized inference system 150. Quantizing a value refers to constraining a value from a continuous or otherwise larger set of values to a smaller, discrete set in accordance with a mapping scheme that defines, for each value in the larger set, a mapping to a corresponding value in the smaller set. Bit-width refers to the number of bits used to represent the integers in fixed-point representation (e.g., a bit-width of 8 means 8 bit values are used to represent the set of integers the floating-point values are quantized to). Quantizing a floating-point value to a bit-width means mapping the floating-point value to a fixed-point integer that can be represented as that bit-width. Quantization techniques for quantizing a value are discussed below. Quantization can be done using asymmetric quantization and/or using symmetric quantization. Quantizing the trained LSTM neural network 101 to a target fixed bit-width will be described with reference to FIG. 2 and FIG. 3, but refers to quantizing, for each gate, the elements of the input weight matrix and the recurrent weight matrix represented as floating-point values. In some implementations, a bias represented as a floating-point value is associated with each gate and is also quantized. The bias can be quantized to the target fixed bit-width or to some other bit-width (the "target bias bit-width").

The quantization system 100 can be configured to quantize the trained LSTM neural network 101 as unsigned or signed integers corresponding with the target fixed bit-width. For example, elements of the input weight matrix and the recurrent weight matrix quantized to a target fixed bit-width of 8 bit values are quantized to the decimal values 0 through 255 as unsigned integers, or −128 through 127 as signed integers.

In some implementations, the quantized inference system 150 is executed on fixed-point hardware (e.g., a special purpose neural network hardware accelerator). Fixed-point hardware is hardware designed to perform operations over data represented as a fixed bit-width (e.g., fixed-point hardware designed to operate on 8 bit values). Fixed-point hardware is less complex relative to hardware of equivalent capabilities that can also handle floating-point operations, making it ideal for implementing on lower-cost devices, particularly mobile devices. In addition, the quantized inference system 150 may need to operate on hardware that offers a parallelization option to facilitate neural network-related operations. The parallelization option may require fixed-point operands (e.g., parallelization of operations only on 8-bit operands, such as on the ARM NEON architecture). Other techniques, such as bit-wise multiplication, allow faster and more cost-efficient multiplication when performed on fixed-point operands.

Figure 2:
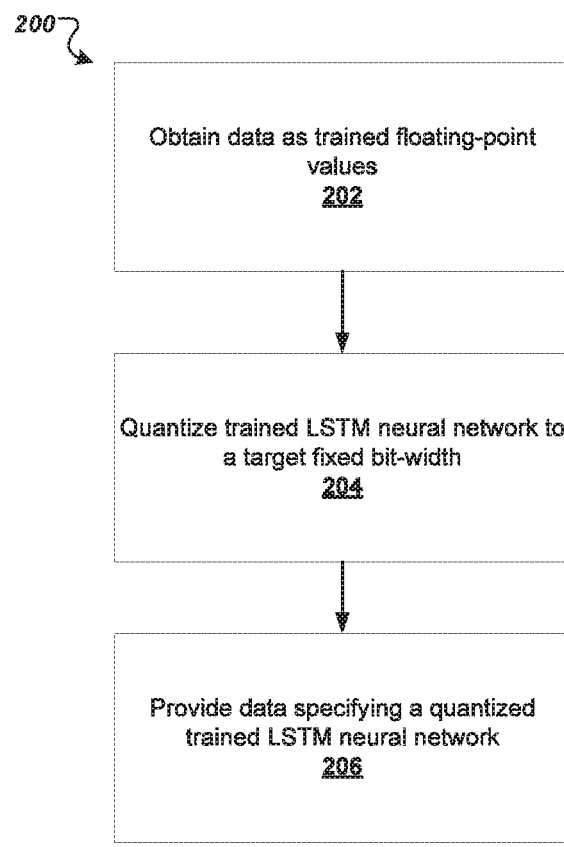
FIG. 2 is a flow diagram of an example process for quantizing a trained LSTM neural network.

FIG. 2 is a flow diagram of an example process 200 for quantizing the trained LSTM neural network. For convenience, the process 200 will be described with respect to a system, (e.g., the quantization system 100 of FIG. 1) having one or more computing devices that execute software to implement the process 200. For example, a quantization system, (e.g., the quantization system 100 of FIG. 1) appropriately programmed in accordance with this specification, can perform the process 200.

As an example, a quantization system 100 quantizes a trained LSTM neural network 101 having a plurality of weights. The LSTM neural network 101 includes one or more LSTM layers 102. An LSTM layer 102 is a neural network layer including a plurality of gates 104, with each gate 104 being associated with an input weight matrix and a recurrent weight matrix. The elements of the input weight matrix and the recurrent weight matrix include the floating-point values representing weights, for each respective LSTM layer 102 in the trained LSTM neural network 101.

Turning to the process 200 of FIG. 2, the quantization system 100 obtains data as floating-point values (step 202). For example, the quantization system 100 obtains data specifying trained floating-point values for each of the weights of the trained LSTM neural network 101.

The quantization system 100 quantizes the trained LSTM neural network 101 to a target fixed bit-width (step 204). The target fixed bit-width is a fixed integer value (e.g., 4 bits, 8 bits, 16 bits) that can be specified prior to quantization. Referring to FIG. 1, if the quantized inference system 150 is implemented on hardware built to execute neural network operations on operands of a certain fixed bit-width, (e.g., 4 bits, 8 bits, 16 bits) then the target fixed bit-width can be that fixed bit-width. For example, if the quantized inference system 150 is implemented on hardware built for neural network operations taking 8 bit operands as input, then the quantization system 100 can quantize the trained LSTM neural network 101 to a target fixed bit-width of 8 bits. The fixed target bit-width can change in response to implementation of the quantized inference system 150 on different hardware. In some implementations, it may be necessary to quantize the values a second time, called re-quantization (discussed below).

As part of quantizing the LSTM neural network 101, the quantization system 100 can quantize each gate output for each gate at each layer in the network.

Returning to the process 200 of FIG. 2, data specifying a quantized LSTM neural network is provided for use in performing quantized inference (step 206). Referring to FIG. 1, for example, data from the quantization system 100 can be provided to the quantized inference system 150 for use in quantized inference. The data can include the quantized weights 152 of the trained LSTM neural network 101. As FIG. 3 shows, and as will be discussed below, the data can be provided (step 408 of FIG. 4) to facilitate re-quantization, as necessary.

Figure 3:
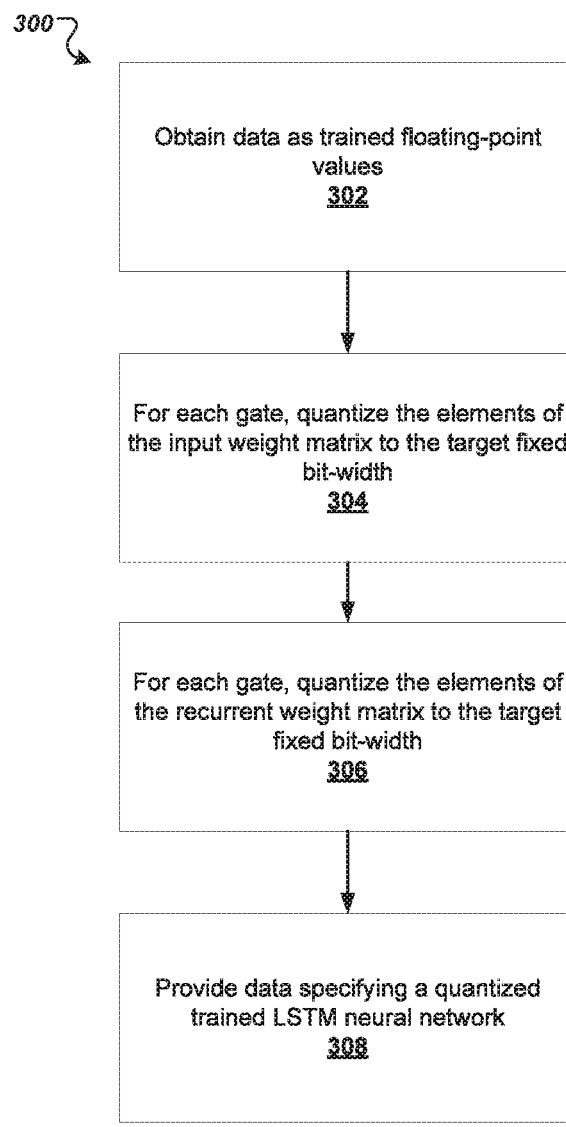
FIG. 3 is a flow diagram of an example process for quantizing a trained LSTM neural network by quantizing, for each gate, each element of the input matrix and the recurrent weight matrix.

FIG. 3 is a flow diagram of an example process 300 for quantizing a trained LSTM neural network 101 by quantizing, for each gate 104, each element of the input matrix and the recurrent weight matrix. A quantization system (e.g., the quantization system 100 of FIG. 1) obtains data as trained floating-point values (step 302). For example, the quantization system 100 obtains data specifying trained floating-point values for each of the weights of the trained LSTM neural network. The weights are stored as elements in the input matrix and the recurrent weight matrix for each gate 104 and each LSTM layer 102 in accordance with the weights learned by the trained LSTM neural network 101 during training.

For each gate 104 in each LSTM layer 102, the elements of the input weight matrix are quantized to the target fixed bit-width (step 304). For each gate 104 in each LSTM layer 102, the elements of the recurrent weight matrix are quantized to a target fixed bit-width (step 306). For each gate, quantization of the elements of the input weight matrix for the gate is performed separately from quantization of the elements of the recurrent weight matrix for the gate (e.g., quantization of the elements of the input weight matrix is performed using the minimum and maximum values of the elements of the input weight matrix and not any of the elements of the recurrent weight matrix). The maximum of the elements of the recurrent weight matrix may be different than the maximum of the elements of the input weight matrix. Similarly, the minimum of the elements of the recurrent weight matrix may be different than the minimum of the elements of the input weight matrix. It is understood that steps 304 and 306 can be done in a variety of ways, including sequentially or in parallel. Similar to step 206, data specifying a quantized LSTM neural network is provided for use in performing quantized inference (step 308). Referring to FIG. 1, for example, data from the quantization system 100 is provided to the quantized inference system 150 for use in quantized inference. The data provided can include the quantized weights 152 obtained from quantizing the elements of the input weight matrix (step 304) and/or obtained from quantizing the elements of the recurrent weight matrix (step 306).

During the quantized inference the quantized inference system 150 can perform a quantized inference task using input data (which can be real-world data collected by one or more sensors) to generate output data. The output data may be control data for controlling a device for operating on the real world, such as a sound generation device, an electromagnetic radiation generation device, and/or an electromechanical device.

In some implementations, for each gate 104, the gate bias is quantized to a target bias bit-width. In other implementations, the quantization system 100 first determines whether the gate bias needs to be quantized at all. For example, if the quantized inference system 150 includes a floating-point co-processor, then in the exemplary implementation the gate bias would not be quantized and instead be left in floating-point form. Alternatively, if the gate bias is already represented as a fixed-point integer, then quantization is not necessary.

Quantizing the gate bias can be done using asymmetric quantization or symmetric quantization, (disclosed below) or by any quantization technique implemented to quantize the elements of the input weight matrix and the elements of the recurrent weight matrix represented as floating-point values. The gate bias can be quantized to a target bias bit-width independent of the target fixed bit-width. For example, the gate bias can be quantized to a target bias bit-width of 32 bits, while the elements of the input weight matrix and the recurrent weight matrix can be quantized to a target fixed bit-width of 8 bits. As another example, both the gate bias and the elements of the input weight matrix and the recurrent weight matrix can be quantized to a bit-width of 16 bits.

Additionally, in some implementations, data is provided, e.g. predetermined data, specifying the quantized gate bias for each gate for use in quantized inference. In yet other implementations, the quantization system determines that for each gate, a gate bias should be quantized, (e.g., the quantization system determines that the gate bias is represented as a floating-point value) and in response, quantizes the gate bias to a target bias bit-width.

Referring to FIG. 3, for each gate, the elements of the input weight matrix quantized in step 304 and the elements of the recurrent weight matrix quantized in step 306 are quantized using asymmetric quantization or symmetric quantization. Whether or not quantization is symmetric quantization or asymmetric quantization depends on the relationship between the minimum value and maximum value of the range of values to be quantized (e.g., the minimum value and the maximum value of the elements in the input weight matrix quantized at step 304 and the minimum value and the maximum value of the elements in the recurrent weight matrix quantized at step 306).

If y is a value to be quantized, then $y_{min}$ (the minimum of y) is the lowest value y can be equal to and $y_{max}$ (the maximum of y) is the largest value y can be equal to. Where y is the result evaluated over some function $f$, then $y_{min}$ and $y_{max}$ represent the lower and upper bounds in the range of $f$ respectively (represented as $[y_{min}, y_{max}]$). Additionally, $f$ can be any mathematical or logical operation (e.g., matrix multiplication). If quantization is symmetric quantization, then the range of $f$ has a minimum value and a maximum value that satisfies the following equation:

$$-y_{max} = y_{min}$$

If the above equation is not satisfied, then the quantization used is asymmetric quantization.

Depending on the quantization technique, certain features of fixed-point hardware can be used. For example, whereas asymmetric quantization requires shifting the range $[y_{mm}, y_{max}]$ by an offset value to account for a possible rounding error inherent in the asymmetric quantization of floating-point values, (discussed below) this offset is not necessary if symmetric quantization is used. Further, while the addition of an offset value is an operation inherent in asymmetric quantization, this extra operation is not required for symmetric quantization because there is no offset value. Therefore, certain fixed-point hardware can use design features for quantization (e.g., making use of hardware that can multiply on fixed-point values in parallel, that would not be possible if an offset then had to be added to the resulting product).

Additionally, in some implementations it may be necessary to anticipate that a quantized inference system will need to "re-quantize" weights after it has been provided with data for quantized inference by a quantization system. In particular, in some implementations, the quantized inference system 150 needs to re-quantize certain values during operation. For example, if the output of one operation is a 32-bit value and that output is input to another operation but the quantized inference system 150 is configured to perform that operation using 8-bit or 16-bit operands, the quantized inference system 150 needs to re-quantize that 32-bit value to 8 bits or 16 bits. This can arise when multiple values are accumulated to generate the output of one operation (e.g., when determining a dot product as part of a matrix multiplication).

Therefore, in some implementations, the data that is provided specifying the quantized LSTM neural network for use in performing quantized inference includes the minimum and maximum value of the range $[y_{min}, y_{max}]$ of a set of values that may need to be re-quantized by the quantized inference system. This is because, in some implementations, the range of a set of values to be quantized is required to calculate the scale factor (discussed below) and therefore quantize a value to a target fixed bit-width.

Figure 4:
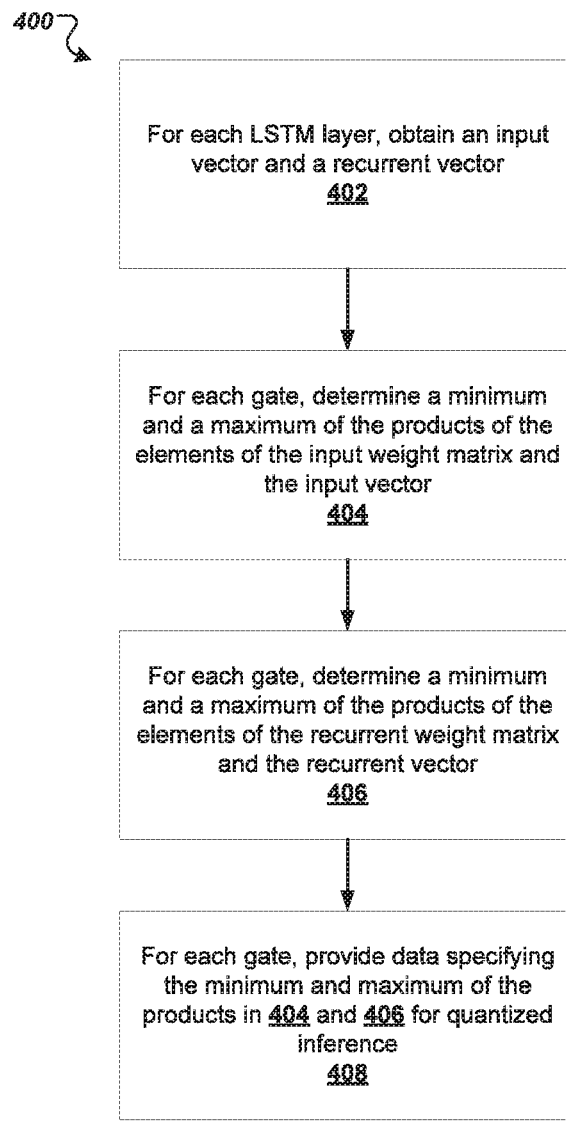
FIG. 4 is a flow diagram of an example process for providing the minimum and the maximum values for quantized inference.

FIG. 4 is a flow diagram of an example process 400 for providing minimum and maximum values for quantized inference.

For each LSTM layer, an input vector and a recurrent vector is obtained (step 402). In some implementations, each LSTM layer receives an input vector and a recurrent vector. The input vector can come from another layer in the trained LSTM neural network, or come from a source outside the neural network. The recurrent vector for an LSTM layer at the current time-step is the output by the LSTM layer at the previous time-step. If the current time-step is the first time-step, then the recurrent vector is set to some initial value (e.g., zero). For each gate, the quantization system 100 determines a minimum and a maximum of the products of the elements of the input weight matrix for the gate and the input vector (step 404). For each gate, the quantization system 100 determines a minimum and a maximum of the products of the elements of the recurrent weight matrix for the gate and the recurrent vector (step 406). For each gate, data is provided specifying the minimum and maximum of the products determined in step 404 and step 406 for quantized inference (step 408).

In some implementations, determining the maximum and the minimum values of the matrix products includes executing the trained LSTM neural network with a set of prototypical inputs. Prototypical inputs are inputs that reflect the range of inputs the system is expected to process. The trained LSTM neural network obtains input vectors for every prototypical input in the set of inputs, for each LSTM layer. Then, for each gate, the quantization system 100 determines a minimum and a maximum of the products of (i) the elements represented as floating-point values of the input weight matrix for the gate and (ii) the input vectors, for all input vectors obtained in the set of prototypical inputs to the trained LSTM neural network 101. For each gate, the quantization system 100 determines a minimum and a maximum of the products of (i) the elements represented as floating-point values of the recurrent weight matrix for the gate and (ii) the recurrent vectors, for all recurrent vectors obtained by the LSTM layer. Each recurrent vector (besides an initial recurrent vector) is output from an LSTM layer at a previous time-step and used as input for the LSTM layer at the current time-step. For each gate, the quantization system 100 provides data specifying the minimum and the maximum values of the products determined for quantized inference.

For example, if the trained LSTM neural network is configured to receive speech utterances, (e.g., as a set of audio files or in text form as a set of phonetic transcriptions) then a set of prototypical inputs would be a set of speech utterances. A set of prototypical inputs is executed on the trained LSTM neural network to generate a set of outputs. The minimum and the maximum values of the set of outputs are the minimum and maximum values for the matrix products.

An accurate minimum and maximum value can be obtained from a relatively small set of inputs (e.g., a very small fraction of the size of the training set for the trained LSTM neural network). For example, in one implementation, a trained LSTM neural network configured as a speech recognizer receives a set of 100 speech utterances. The set of speech utterances is executed on the trained LSTM neural network and a set of outputs is generated (e.g., a maximum value and a minimum value for the products of the elements represented as floating-point values for the input matrix and the input vector, for each gate, and a maximum and a minimum value for the products of the elements represented as floating-point values for the recurrent weight matrix and the recurrent vector, for each gate). The maximum and the minimum values of the set of outputs is provided for quantized reference to a quantized inference system (e.g., the quantized inference system 150 of FIG. 1).

Quantization of the elements represented by floating-point values of the input weight matrix and recurrent weight matrix for each gate is done by one or more quantization techniques. A quantization technique refers to how each element represented by a floating-point value is quantized to a fixed bit-width. For example, quantization techniques include asymmetric quantization and symmetric quantization.

In some implementations, the quantization technique includes quantizing one or more of the elements of the input weight matrix and the recurrent weight matrix by determining a scale factor and applying the scale factor to each element in the input weight matrix and the recurrent weight matrix. The scale factor is how the larger set of values to be quantized is mapped to a corresponding smaller range of fixed-point integers, by scaling the values in the larger set of floating-point values to correspond to a quantized value in the smaller set of fixed-point integers. Calculating the scale factor varies depending on the quantization technique used (e.g., symmetric quantization vs. asymmetric quantization).

The scale factor depends on whether the quantized values are to be represented as unsigned integers or as signed integers. For unsigned integer representation, given a target fixed bit-width, a maximum value and a minimum value, the scale factor is defined as:

$$\text{scale factor} = \frac{2^{\text{target fixed bit-width}} - 1}{|\text{maximum value} - \text{minimum value}|}$$

A bit scale for a target fixed bit-width is defined as $2^{\text{target fixed bit-width}} - 1$ and represents the upper limit of values that can be represented in decimal form for the target fixed bit-width. For example, for 8 bits, the bit scale is 255, so values quantized to 8 bits can represent all the unsigned integers from 0 to 255. The above formulation of the scale factor for unsigned integer representation can be rewritten as:

$$\text{scale factor} = \frac{\text{bit scale}}{|\text{maximum value} - \text{minimum value}|}$$

In some implementations, for a value y, a scale factor Q, and a minimum value $y_{min}$, the quantized value y' is equal to $y'=Q*(y-y_{min})$. If the quantized value y' is stored to a signed integer, then y' is subtracted (reduced) by (bit scale)/2. Because the minimum and maximum values are known, y' can then be re-quantized to a fixed bit-width matching the optimized hardware used at inference.

It may be necessary to multiply floating-point values expressed from quantized integers. In that case, approximate recovery of the pre-quantized y is represented in terms of the scale factor Q, quantized value y', and a minimum value $y_{min}$, as: $y=Q^{-1}*(y'+Q*y_{min})$ (where $Q^{-1}$ is equal to $\frac{1}{Q}$).

Therefore, the multiplication of two real values x and z expressed from quantized integers is: $x*z=Q_x^{-1}*Q_z^{-1}*[(x'+Q*x_{min})*(z'+Q*z_{min})]$. However, to make the multiplication result in a fixed-point product, $(x'+Q*x_{min})$ and $(z'+Q*z_{min})$ are represented as fixed-point integers.

Quantizing $(x'+Q*x_{min})$ and $(z'+Q*z_{min})$ introduces a potential rounding error, because precision is inherently lost when quantizing real values to quantized integer values. The loss of precision can be demonstrated as: $\text{Error}=Q*y_{min}-\text{round}(Q*y_{min})$ where $\text{round}(Q*y_{min})$ is $Q*y_{min}$ rounded to the nearest integer. A rounding error can result in a significant bias during computation, affecting the accuracy of inference from the trained quantized LSTM neural network. For example, referring to FIG. 1, for one or more elements in the input weight matrix and the recurrent weight matrix of a gate 104, a rounding error may be inadvertently introduced if elements representing floating-point values are quantized.

To eliminate this rounding error, some implementations assign the value Q $x_{min}$ for a given value x to be exactly representable in the integer scale. For implementations using asymmetric quantization, this can be achieved, for example, by shifting the range of values represented as $[x_{min}, x_{max}]$. This is equivalent to making the real value 0.0 exactly representable in the integer scale: $0.0=Q^{-1}*(x_{zero}'+Q*x_{min})$, where $x_{zero}'$ is the quantized value the real value 0.0 is quantized to. Because $x_{min}$, and Q (and by extension, $Q^{-1}$) are known for a given x, then $x_{zero}'=-Q*x_{min}$.

$x_{zero}'$ is referred to as the zero point. Because the range of values to be quantized is shifted, $x_{min}$ may be different than the true minimum value of the values, to guarantee exact quantized representation.

If quantization is done via symmetric quantization, then there is no offset to add to shift the range of the values to be quantized and the values to be quantized are assumed to be centered around zero. To be centered around zero means that the values are distributed evenly around the real value 0.0. Because of the definition of symmetric quantization, $(-y_{max}=y_{min})$ quantization of a value y' is $y'=Q*(y+y_{max})$ and the scale factor Q is written as:

$$\text{scale factor} = \frac{\text{bit scale}}{2*(y_{max})}$$

Therefore, if symmetric quantization is used, then a quantized value y' is represented as: $y'=Q*y$, where the scale factor Q can be re-written as:

$$\text{scale factor} = \frac{\text{bit scale}}{2*\max(|y_{min}|, y_{max})}$$

The multiplication of two real values x and z expressed from symmetrically quantized integers is: $x*z=Q_x^{-1}*Qz^{-1}*(x'*z')$. By not adding an offset, symmetric quantization can be performed using features available only for multiplication operations on certain hardware platforms (e.g., parallel multiplication over 8 bit operands available on the ARM NEON architecture, or the x86 architecture). For example, 32 bit floating point values can be quantized to a smaller bit-width to compute multiple operations at once (e.g., two pairs of 8 bit operands for multiplication on hardware that supports 32 bit values). The above also means that the values are spread out evenly on the positive and negative sides of the quantized scale (e.g., for 8 bit integers the quantized values are spread between −127 and 127).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework (e.g., a TensorFlow framework, a Microsoft Cognitive Toolkit framework, an Apache Singa framework, or an Apache MXNet framework).

Implementations of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for quantizing a trained long short-term memory (LSTM) neural network having a plurality of weights, the method comprising:
   obtaining data specifying trained floating-point values for each of the weights of the trained LSTM neural network, the trained LSTM neural network comprising one or more LSTM layers, each LSTM layer having a plurality of gates, each gate of the plurality of gates comprising a corresponding gate bias and is associated with an input weight matrix and a recurrent weight matrix;
   determining, from first elements of the input weight matrix, that a first ratio between a minimum value and a maximum value of the first elements fails to satisfy a threshold;
   determining, from second elements of the recurrent weight matrix, that a second ratio between a minimum value and a maximum value of the second elements fails to satisfy the threshold;
   determining that the first elements of the input weight matrix or the second elements of the recurrent weight matrix are represented as floating-point values;
   in response that the first elements of the input weight matrix or the second elements of the recurrent weight matrix are represented as floating-point values, determining a rounding error;
   quantizing the trained LSTM neural network by:
      for at least one of the plurality of gates, determining that the corresponding gate bias of the at least one of the plurality of gates is represented as a floating-point value;
      based on determining that the corresponding gate bias of the at least one of the plurality of gates is represented as the floating-point value, quantizing the corresponding gate bias of the at least one of the plurality of gates to a target bias bit-width;
      based on determining that the first ratio between the minimum value and the maximum value of the first elements fails to satisfy the threshold, for each gate, quantizing the first elements of the input weight matrix to a target fixed bit-width using asymmetric quantization with an offset value;
      based on determining that the second ratio between the minimum value and the maximum value of the second elements fails to satisfy the threshold, for each gate, quantizing the second elements of the recurrent weight matrix to the target fixed bit-width using asymmetric quantization with the offset value; and for each LSTM layer, quantizing the first elements of the input weight matrix or the second elements of the recurrent weight matrix to the target fixed bit-width using the rounding error; and providing data specifying a quantized LSTM neural network for use in performing quantized inference.

2. The method of claim 1, wherein quantizing the trained LSTM neural network further comprises:

for each gate, determining a scale factor, wherein the scale factor is:

$$\text{scale factor} = \frac{2^{\text{target fixed bit-width}} - 1}{|\text{maximum value} - \text{minimum value}|}$$

for each gate, applying the scale factor to the first elements of the input weight matrix; and for each gate, applying the scale factor to the second elements of the recurrent weight matrix.

3. The method of claim 1, wherein quantizing the LSTM network further comprises quantizing, for each gate, a respective gate output for the gate obtained by processing a respective input through the gate.

4. The method of claim 1, wherein the target fixed bit-width is 8 bits.

5. The method of claim 1, wherein each LSTM layer receives an input vector and a recurrent vector, and wherein the method further comprises:

for each gate, determining a minimum and a maximum of products of the trained floating-point values of the input weight matrix and input vectors for a set of test inputs to the trained LSTM neural network;

for each gate, determining a minimum and a maximum of products of the trained floating-point values of the recurrent weight matrix and recurrent vectors for the set of test inputs;

for each gate, determining a minimum and a maximum of respective gate outputs for the gate; and providing data specifying the quantized LSTM neural network for use in performing quantized inference, the data comprising:

the minimum and the maximum of the products of the trained floating-point values of the input weight matrix and the input vectors for the set of test inputs, the minimum and the maximum of the products of the trained floating-point values of the recurrent weight matrix and the recurrent vectors for the set of test inputs, and the minimum and the maximum of the respective gate outputs for each gate in the LSTM neural network.

6. The method of claim 5, wherein the trained LSTM neural network is configured to receive speech utterances and the set of test inputs is data representing a speech utterance.

7. The method of claim 1, wherein quantizing the corresponding gate bias of the at least one of the plurality of gates to the target bias bit-width comprises quantizing the corresponding gate bias using asymmetric quantization.

8. The method of claim 1, wherein the target bias bit-width is different than the target fixed bit-width.

9. The method of claim 1, wherein the target bias bit-width is 32 bits.

10. The method of claim 1, wherein providing data specifying the quantized LSTM neural network for use in performing quantized inference comprises for each LSTM layer, providing the quantized corresponding gate bias for the at least one of the plurality of gates.

11. The method of claim 1, further comprising:

determining that a floating-point co-processor is not available to a target computing device used to implement the trained LSTM neural network, wherein quantizing the corresponding gate bias of the at least one of the plurality of gates is further based on determining that a floating-point co-processor is not available to a target computing device used to implement the trained LSTM neural network.

12. A method of performing an inference task of generating output data based on input data, the method comprising:

obtaining data specifying trained floating-point values for each of a plurality of weights of a trained long short-term memory (LSTM) neural network, the trained LSTM neural network comprising one or more LSTM layers, each LSTM layer having a plurality of gates, each gate of the plurality of gates comprising a corresponding gate bias and is associated with an input weight matrix and a recurrent weight matrix;

determining, from first elements of the input weight matrix, that a first ratio between a minimum value and a maximum value of the first elements fails to satisfy a threshold;

determining, from second elements of the recurrent weight matrix, that a second ratio between a minimum value and a maximum value of the second elements fails to satisfy the threshold;

determining that the first elements of the input weight matrix or the second elements of the recurrent weight matrix are represented as floating-point values;

in response that the first elements of the input weight matrix or the second elements of the recurrent weight matrix are represented as floating-point values, determining a rounding error;

quantizing the trained LSTM neural network by:

for at least one of the plurality of gates, determining that the corresponding gate bias of the at least one of the plurality of gates is represented as a floating-point value;

based on determining that the corresponding gate bias of the at least one of the plurality of gates is represented as the floating-point value, quantizing the corresponding gate bias of the at least one of the plurality of gates to a target bias bit-width;

based on determining that the first ratio between the minimum value and the maximum value of the first elements fails to satisfy the threshold, for each gate, quantizing the first elements of the input weight matrix to a target fixed bit-width using asymmetric quantization with an offset value;

based on determining that the second ratio between the minimum value and the maximum value of the second elements fails to satisfy the threshold, for each gate, quantizing the second elements of the recurrent weight matrix to the target fixed bit-width using asymmetric quantization with the offset value; and for each LSTM layer, quantizing the first elements of the input weight matrix or the second elements of the recurrent weight matrix to the target fixed bit-width using the rounding error;

obtaining data specifying a quantized LSTM neural network having a plurality of weights;
generating the quantized LSTM neural network based on the obtained data; and
processing the input data through the quantized LSTM neural network to generate the output data.

13. The method of claim 12, wherein:
the input data comprises real-world data obtained by at least one sensor and is representative of the real world; and
the output data comprises control data for controlling a device arranged to operate on the input data.

14. One or more non-transitory computer-readable storage media storing instructions that when executed by one or more computers cause the one or more computers to perform operations for quantizing a trained long short-term memory (LSTM) neural network having a plurality of weights, the operations comprising:
obtaining data specifying trained floating-point values for each of the weights of the trained LSTM neural network, the trained LSTM neural network comprising one or more LSTM layers, each LSTM layer having a plurality of gates, each gate of the plurality of gates comprising a corresponding gate bias and is associated with an input weight matrix and a recurrent weight matrix;
determining, from first elements of the input weight matrix, that a first ratio between a minimum value and a maximum value of the first elements fails to satisfy a threshold;
determining, from second elements of the recurrent weight matrix, that a second ratio between a minimum value and a maximum value of the second elements fails to satisfy the threshold;
determining that the first elements of the input weight matrix or the second elements of the recurrent weight matrix are represented as floating-point values;
in response that the first elements of the input weight matrix or the second elements of the recurrent weight matrix are represented as floating-point values, determining a rounding error;
quantizing the trained LSTM neural network by:
for at least one of the plurality of gates, determining that the corresponding gate bias of the at least one of the plurality of gates is represented as a floating-point value;
based on determining that the corresponding gate bias of the at least one of the plurality of gates is represented as the floating-point value, quantizing the corresponding gate bias of the at least one of the plurality of gates to a target bias bit-width;
based on determining that the first ratio between the minimum value and the maximum value of the first elements fails to satisfy the threshold, for each gate, quantizing the first elements of the input weight matrix to a target fixed bit-width using asymmetric quantization with an offset value;
based on determining that the second ratio between the minimum value and the maximum value of the second elements fails to satisfy the threshold, for each gate, quantizing the second elements of the recurrent weight matrix to the target fixed bit-width using asymmetric quantization with the offset value; and
for each LSTM layer, quantizing the first elements of the input weight matrix or the second elements of the recurrent weight matrix to the target fixed bit-width using the rounding error; and
providing data specifying a quantized LSTM neural network for use in performing quantized inference.

15. A system comprising one or more computers and one or more storage devices storing instructions that when executed by one or more computers cause the one or more computers to perform operations for quantizing a trained long short-term memory (LSTM) neural network having a plurality of weights, the operations comprising:
obtaining data specifying trained floating-point values for each of the weights of the trained LSTM neural network, the trained LSTM neural network comprising one or more LSTM layers, each LSTM layer having a plurality of gates, each gate of the plurality of gates comprising a corresponding gate bias and is associated with an input weight matrix and a recurrent weight matrix;
determining, from first elements of the input weight matrix, that a first ratio between a minimum value and a maximum value of the first elements fails to satisfy a threshold;
determining, from second elements of the recurrent weight matrix, that a second ratio between a minimum value and a maximum value of the second elements fails to satisfy the threshold;
determining that the first elements of the input weight matrix or the second elements of the recurrent weight matrix are represented as floating-point values;
in response that the first elements of the input weight matrix or the second elements of the recurrent weight matrix are represented as floating-point values, determining a rounding error;
quantizing the trained LSTM neural network by:
for at least one of the plurality of gates, determining that the corresponding gate bias of the at least one of the plurality of gates is represented as a floating-point value;
based on determining that the corresponding gate bias of the at least one of the plurality of gates is represented as the floating-point value, quantizing the corresponding gate bias of the at least one of the plurality of gates to a target bias bit-width;
based on determining that the first ratio between the minimum value and the maximum value of the first elements fails to satisfy the threshold, for each gate, quantizing the first elements of the input weight matrix to a target fixed bit-width using asymmetric quantization with an offset value;
based on determining that the second ratio between the minimum value and the maximum value of the second elements fails to satisfy the threshold, for each gate, quantizing the second elements of the recurrent weight matrix to the target fixed bit-width using asymmetric quantization with the offset value; and
for each LSTM layer, quantizing the first elements of the input weight matrix or the second elements of the recurrent weight matrix to the target fixed bit-width using the rounding error; and
providing data specifying a quantized LSTM neural network for use in performing quantized inference.

* * * * *